United States Patent [19]

Walker, Jr.

[11] Patent Number: 5,347,973
[45] Date of Patent: Sep. 20, 1994

[54] VACUUM RELIEF VALVE

[75] Inventor: Robert A. Walker, Jr., Northridge, Calif.

[73] Assignee: Walker Design Inc., Van Nuys, Calif.

[21] Appl. No.: 82,750

[22] Filed: Jun. 25, 1993

[51] Int. Cl.⁵ .......................................... F02M 25/06
[52] U.S. Cl. ................................................. 123/574
[58] Field of Search ............ 123/572, 573, 574, 41.86, 123/198 E, 196 A

[56] References Cited

U.S. PATENT DOCUMENTS

| | | | |
|---|---|---|---|
| 2,362,558 | 11/1944 | Janzich | 123/574 |
| 3,359,960 | 12/1967 | Pittsley | |
| 3,678,910 | 7/1972 | Marlett | 123/574 |
| 3,709,204 | 1/1973 | Noponen | |
| 3,766,898 | 10/1973 | McMullen | |
| 4,245,592 | 1/1981 | Atkins | 123/572 |
| 4,667,647 | 5/1987 | Ohtaka et al. | 123/573 |
| 4,724,807 | 2/1988 | Walker | 123/196 A |
| 4,768,493 | 9/1988 | Ohtaka et al. | 123/573 |
| 4,856,487 | 8/1989 | Furuya | 123/574 |
| 4,904,657 | 3/1990 | Betterton et al. | 123/574 |
| 5,140,957 | 8/1992 | Walker | 123/198 E |

Primary Examiner—Tony M. Argenbright
Assistant Examiner—M. Macy
Attorney, Agent, or Firm—Christie, Parker & Hale

[57] ABSTRACT

A vacuum relief valve for use with internal combustion engines is provided. The valve is connected to the breathing tubes of an engine on one side and to the air induction system of the engine on the opposite side. Under certain conditions during engine operation, the induction system has a tendency to reduce the pressure within the crankcase creating a partial vacuum. The vacuum relief valve is interposed between the induction system and the crankcase and control or limits the amount of partial vacuum thus created to a maximum of seven inches of vacuum or less. This is accomplished by providing means for limiting the size of a passageway through the valve and thereby limit the amount of suction that can be communicated by the induction system to the crankcase. In one embodiment, a spring biased piston is used to control the size of the passageway. Other valving mechanisms are also contemplated. An auxiliary pathway to atmosphere is also incorporated into the valve so that the breather tubes can be vented when the passageway through the valve is partially or fully closed.

13 Claims, 6 Drawing Sheets

VACUUM RELIEF VALVE

FIELD OF THE INVENTION

The present invention relates to a vacuum limiting assembly which controls and dynamically adjusts the amount of vacuum an internal combustion engine. In particular, this invention relates to a vacuum relief valve in a flow-line between an internal combustion engine and the air intake system for the engine and thereby regulates the pressure or vacuum of the engine atmosphere.

BACKGROUND OF THE INVENTION

In the operation of internal combustion engines, a number of operational and pollution problems have been encountered. Gasoline engines are a major source of air pollution including hydrocarbons and nitrous oxides. Diesel engines are subject to significant loss of oil, generate undesirable air pollution and are noisy in operation. To reduce air pollution, vehicle and engine design has been changed to provide catalytic converters for exhaust gases and blowby mechanisms for capturing emissions from crankcase breathers and recycling them back into the air intake system for the engine.

In gasoline engines, pollution control laws have mandated the engine emissions be reduced, and prevented from venting to the atmosphere. Engine exhaust must be cleaned and rendered environmentally safe. As a result, such advances as unleaded fuels and catalytic converters have been developed. Blowby devices such as pollution control valves (PCV) have become required standard equipment for all automobiles. These blowby devices capture emissions from the crankcase and communicate them in a closed system to the air intake system for the automobile. Here the emissions are mixed with incoming air before being introduced into the carburetor.

Because emissions from diesel engines are heavily laden with oil and other heavy hydrocarbons, air-oil separators such as are described and claimed in U.S. Pat. Nos. 4,274,807 and 5,140,957 have been developed. Such devices silence and filter air in an input flow line to an engine, separate oil and other hydrocarbons emitted from a contaminated engine atmosphere and regulate the pressure within the engine.

A recurrent problem encountered in engine operation, be it gasoline or diesel, is that a vacuum is created within the crankcase when the engine induction (air intake) system becomes fouled or malfunctions. This problem is magnified at high engine RPM's. It is important therefore that steps be taken to limit and/or prevent such vacuum from being created. Left unattended, the vacuum buildup tends to extract oil and other pollutants from the engine and can result in engine malfunction, safety problems and significant engine damage.

If the amount of vacuum is not controlled, a significant amount of oil and oil laden air will be pulled from the crankcase into the induction system of the engine or into the air-oil separator. The problem becomes more acute in cases where the air filter or separator becomes fouled or contaminated. When this occurs, the suction created by a turbocharger or the induction system of the engine increases the pressure differential between the breathers and the induction system thus increasing the vacuum in the crankcase.

A need therefore exists to provide a mechanism for exerting control over the amount of vacuum in the crankcase and limit it to a certain predetermined maximum.

SUMMARY OF THE INVENTION

The present invention provides such a mechanism in the form of a vacuum limiting valve to be used with internal combustion engines and specifically a valve located in line between the crankcase and the air induction system of the engine. The vacuum limiting valve provides a means for limiting or completely preventing the existence of negative pressure (partial vacuum) in the crankcase of the engine.

In one arrangement, the invention is used with a conventional air induction system for an internal combustion engine. The invention provides an apparatus for controlling engine crankcase vacuum comprising a housing for a spring loaded piston. By adjusting the position of the piston within the housing as the vacuum in the crankcase increases and decreases, the size of a passage through the housing is controlled and thus the vacuum between the engine breather and the induction system is regulated. The apparatus also includes an inlet port and an outlet port and a vent to atmosphere.

In another arrangement, the invention is used with an air-oil separator and is connected so that the outlet end of the separator is connected in line with the induction system for an engine. The inlet end of the separator is coupled through the vacuum limiting valve of the present invention to the crankcase breather or breathers on the engine. An oil drain is provided in the separator housing for returning the recovered oil to the engine block. A check valve is coupled between the oil drain and the engine to prevent oil backflow due to the existence of a higher vacuum in the separator than in the engine crankcase.

The vacuum limiting valve of the present invention provides a mechanism for adjusting the size of the passageway from the breather to the separator and thereby prevents the build-up of a sufficiently high vacuum in the crankcase which could affect engine operation or actually cause oil to be drawn from the crankcase into the separator.

BRIEF DESCRIPTION OF THE DRAWINGS

The foregoing and other features of the invention will be better understood by reference to the drawings wherein.

DETAILED DESCRIPTION OF THE INVENTION

Figure 1:
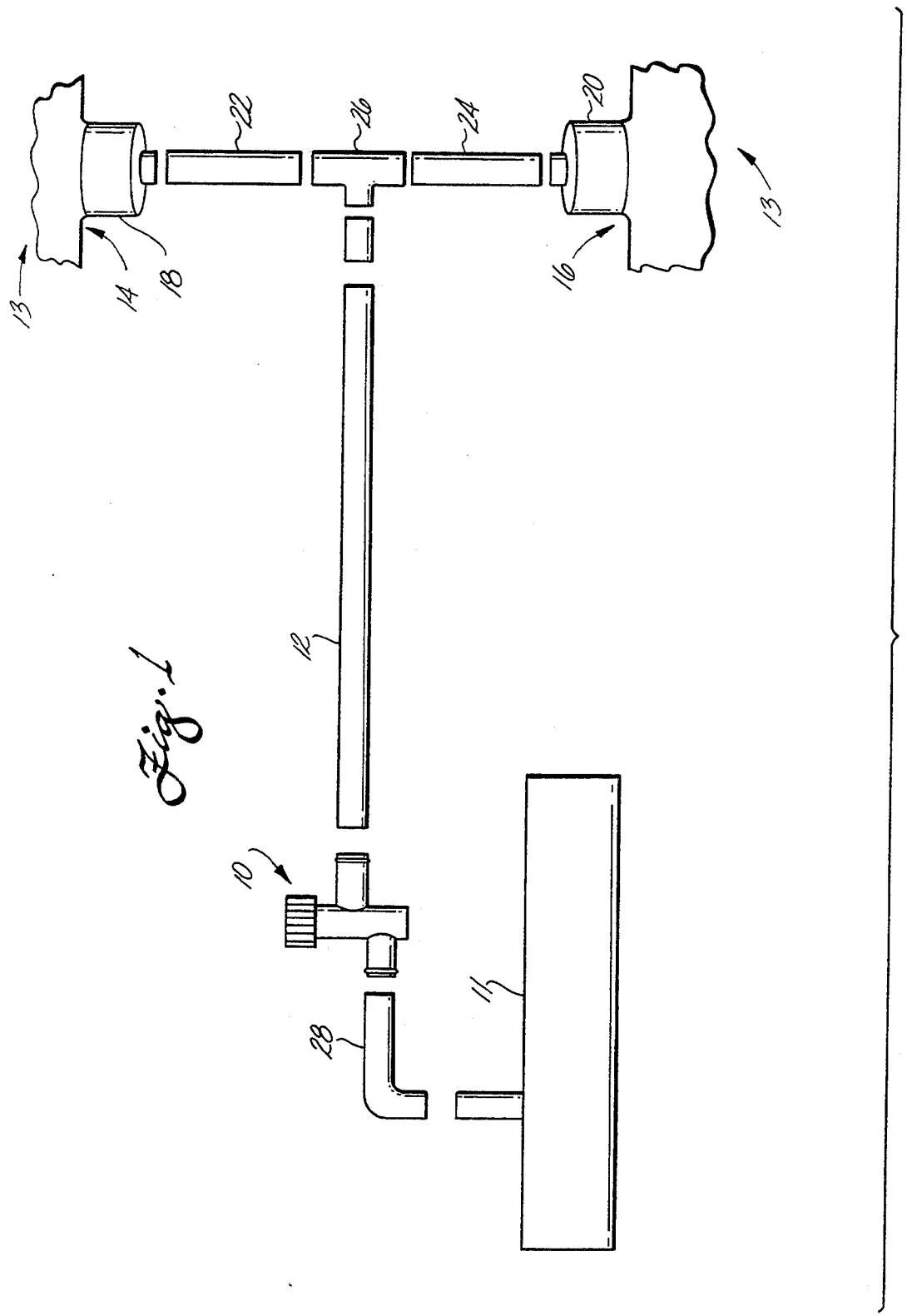
FIG. 1 is a schematic side-elevation view of a vacuum relief valve according to the present invention as it is used between the breather tubes of an internal combustion engine and the induction system of the engine.

As shown in FIG. 1, a vacuum relief valve 10 according to the present invention is shown as it would be located in a typical installation on an internal combustion or diesel engine. Valve 10 is connected at its input side by means of a conduit 12 to crankcase breather tubes 14, 16 of an engine 13. Caps 18, 20 cover the breather openings and are connected by conduits 22, 24 to a T junction fitting 26, the outlet of which is connected to the inlet to conduit 12.

On its output side, valve 10 is connected by conduit 28 to the intake tube 11 of an air filter for a turbocharger. The air filter is in turn coupled to a turbocharger (not shown) in the induction system of the engine.

The vacuum relief valve or vacuum limiter 10 is provided to control the amount of vacuum which is drawn on the engine and thereby prevent oil from being extracted from the crankcase. In the presently preferred embodiment of the invention, a piston and spring combination is provided which acts as a variable valve to control the size of the passage through the limiter and thereby control the amount of vacuum (or suction) which the induction system of the engine is allowed to pull on the crankcase. In instances of very high RPM's, the piston closes and completely valves off the passage between the crankcase breathers and the induction system. As the piston closes due to increasing vacuum thereby reducing the size of the passage to the induction system, the movement of the piston simultaneously opens an alternate passage through the valve to vent the crankcase atmosphere.

Figure 2:
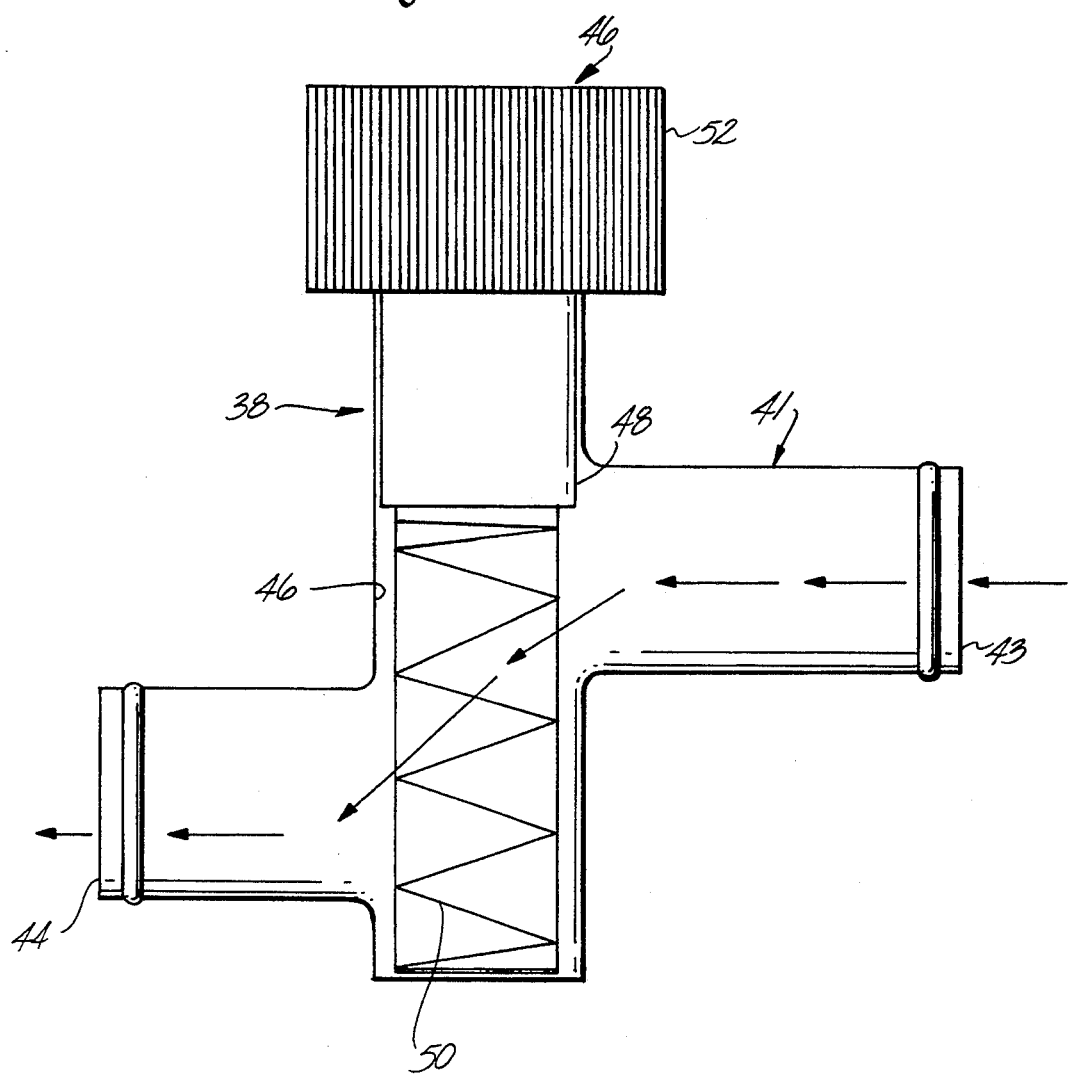
FIG. 2 is a schematic side-elevation view of one embodiment of the relief valve according to the present invention with the valve open and the piston in the raised position.
Figure 3:
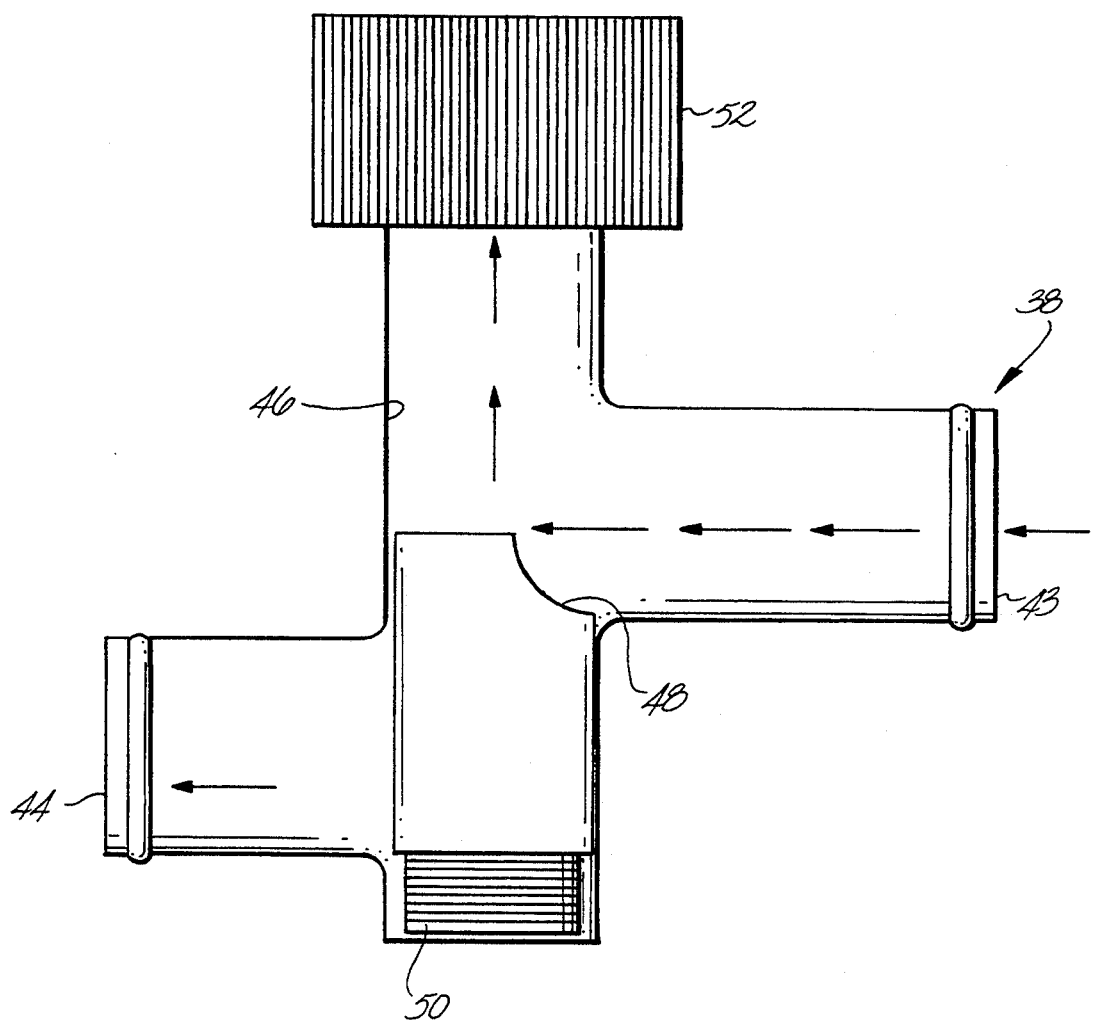
FIG. 3 is a schematic side-elevation view of the relief valve shown in FIG. 2 with the valve closed and the piston in the lowered position.

FIGS. 2 and 3 show detailed views of a vacuum relief valve 38 according to the present invention. FIG. 2 shows valve 10 in the open position. Inlet 43 to housing 41 is connected to the engine breathers and communicates with outlet from the housing 44 through a transversely disposed cylindrical chamber or conduit 46 in which a piston 48 supported by a compression spring 50 is located. The end of chamber 46 opposite the compression spring 50 is open and communicates to atmosphere through a washable air filter 52 of the K&N-type. The outlet 44 of vacuum limiter valve 38 is connected to the intake tube from an air filter to the engine induction system or a turbocharger.

It is important that the vacuum which is created in the crankcase not be too large. The presently preferred limit is 7 inches of vacuum. The vacuum in the crankcase has a tendency to increase as the RPM's of the engine increases thereby causing the engine induction system to exert a higher and higher degree of suction on the crankcase through the crankcase breathers. In such an event a relatively large amount of oil and oil laden air can be pulled from the crankcase into the separator apparatus causing the induction system and air filters to become fouled. The tendency is exacerbated when the induction system is already dirty or the air filter has become contaminated through ordinary operation.

The vacuum limiter valve assembly 10 of the present invention prevents the occurrence of too large of a pressure differential. As shown in FIG. 2, piston 48 is in its open position and an essentially unobstructed air flow passage exists from the engine crankcase breathers through inlet 43 to the outlet 44. When the vacuum exerted by the induction system increases, compression spring 50 is compressed drawing piston 48 downwardly from its open position having the effect of constricting the physical dimensions of the passage way between the inlet and the outlet as it is compressed. When the pressure differential is sufficiently large, the piston 48 is drawn to the position shown in FIG. 3 and the compression spring is fully compressed such that the piston totally closes the conduit leading to the separator and totally blocks off the passage between the inlet 43 and the outlet 44 in the vacuum limiter. In this condition, the engine crankcase breathers are now connected through air filter 52 to atmosphere.

Figure 4:
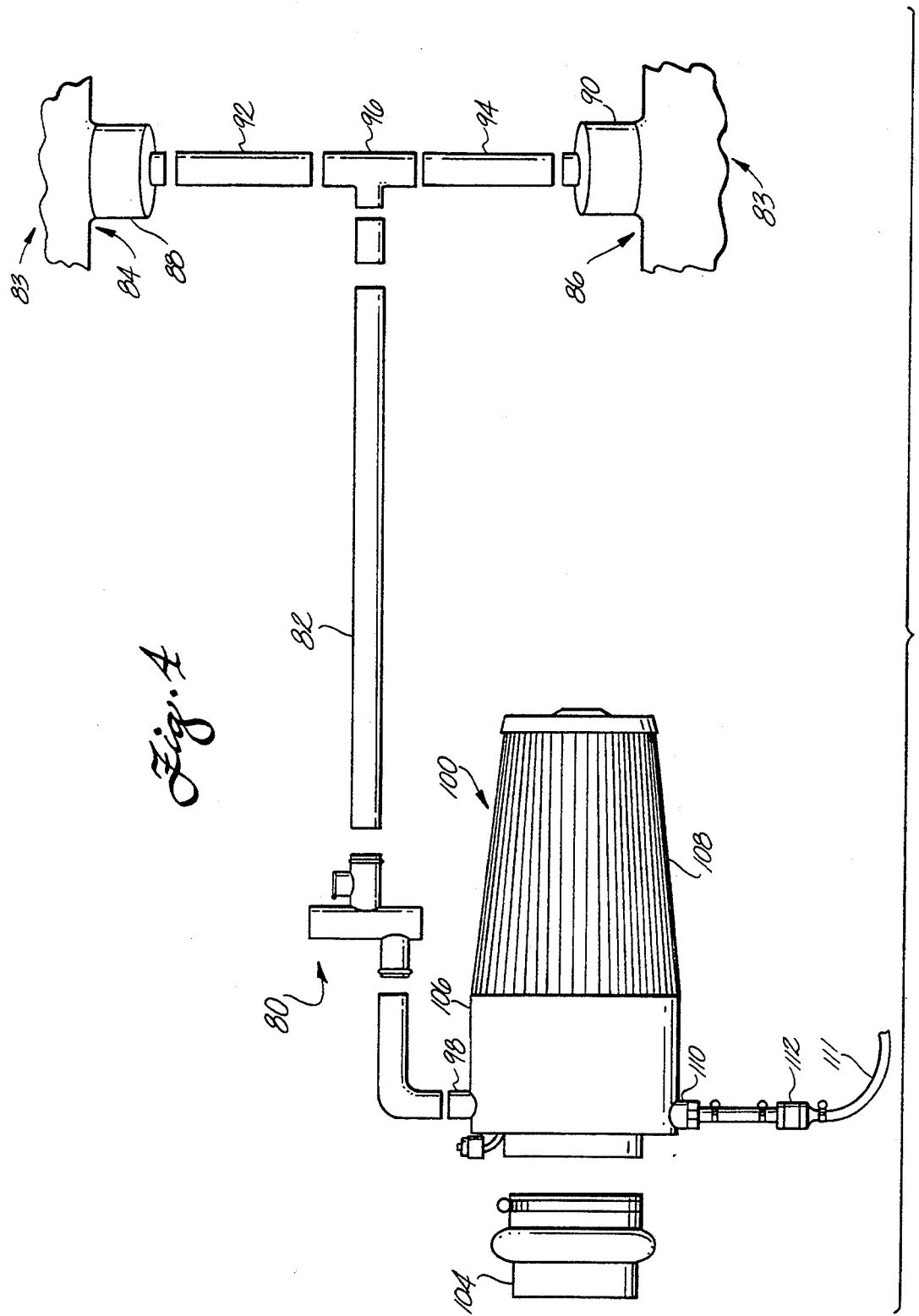
FIG. 4 is a schematic side-elevation view of an alternate embodiment of a vacuum relief valve according to the present invention as it is used between the engine breathers of an engine and the input of an air-oil separating and air filtering apparatus.
Figure 5:
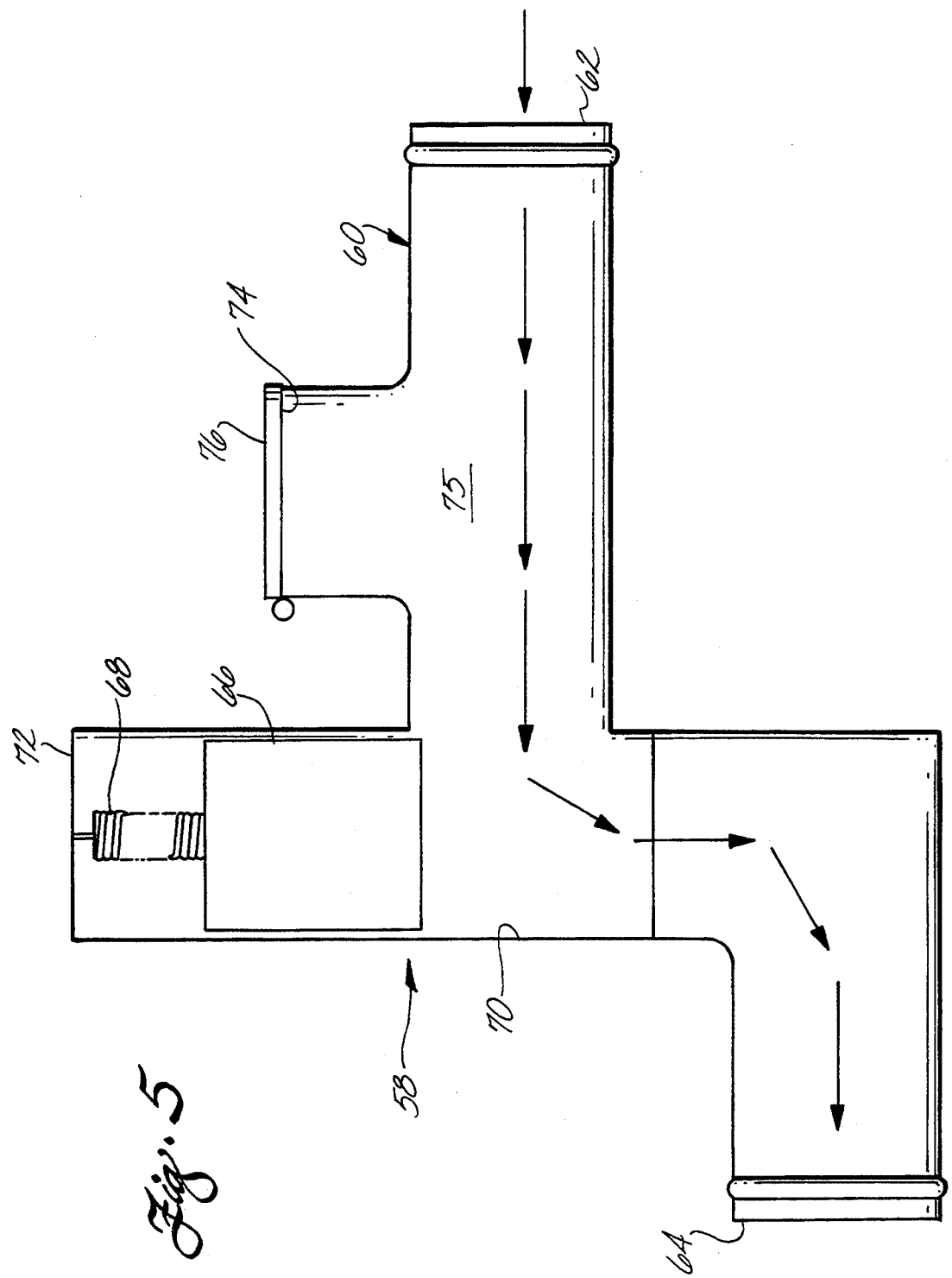
FIG. 5 is a schematic side-elevation view of the embodiment of the relief valve of FIG. 4 with the valve open and the piston in the raised position.
Figure 6:
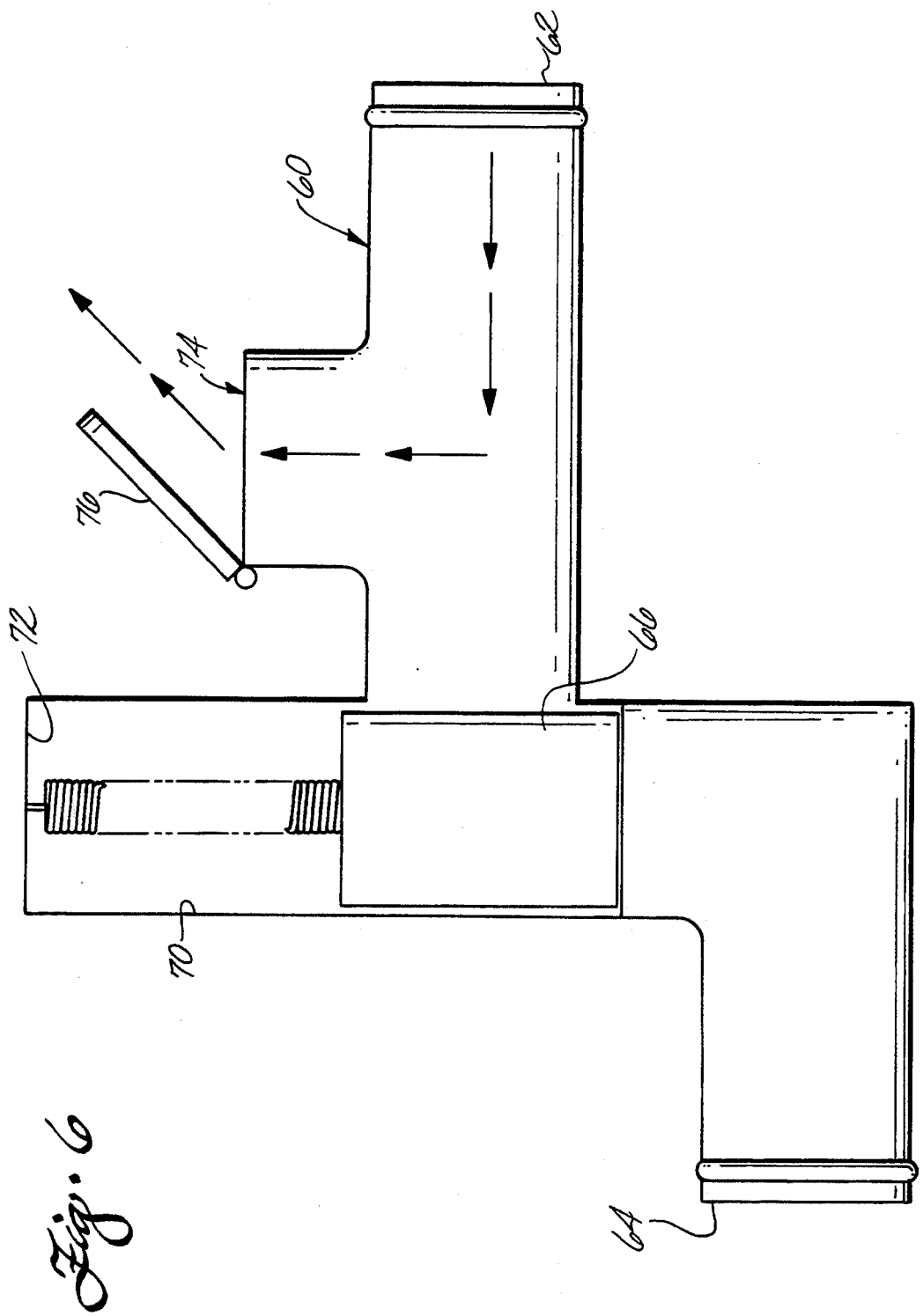
FIG. 6 is a schematic side-elevation view of the valve of FIG. 5 with the valve closed and the piston in the lowered position.

An alternate embodiment of the vacuum limiting valve of the present invention is shown in FIGS. 4, 5 and 6. Valve 80 is connected at its input side by means of a conduit 82 to crankcase breathing tubes 84, 86 of an engine 83. Caps 88, 90 cover the breather openings and are connected by conduits 92, 94 to a T-junction fitting 96, the outlet of which is connected to the inlet to conduit 82.

On its output side, valve 80 is connected to the input port 98 of an air-oil separator 100 such as that described and claimed in U.S. Pat. No. 5,140,957. The outlet side 85 of separator 100 is in turn coupled to a conduit 104 which connects the separator to the induction system of the engine. The induction system for the engine may include, but does not necessarily require, a turbocharger. The separator comprises a body section 106 and a filter section 108. Oil collected by the separator passes out of the separator through a drain outlet 110 and is transferred back to the engine block by means of conduit 111. A check valve 112 is provided to prevent oil from being sucked up out of the crankcase and into the separate apparatus.

As has been previously indicated, attachment of an air-oil separator apparatus to an engine creates a slight vacuum in the crankcase of an engine. In normal engine operation, the presence of oil droplets or particles in the crankcase atmosphere is due in part to a relatively high pressure within the crankcase. By attaching a separator apparatus to an engine, the eliminated pressure in the crankcase is eliminated and a slight vacuum replaces the above atmospheric pressure in the crankcase. This change to a small vacuum within the crankcase serves to significantly decrease the amount of oil, contaminant, and blow by-products which are entrained in the crankcase air and has the effect of reducing oil consumption significantly. This is normally beneficial since it reduces a tendency of the positive pressure to expel oil from the crankcase. It has been found however that as engine RPM's increase, the vacuum drawn on the crankcase by the turbocharger or the induction system of the engine increases and has a tendency to pull oil from the crankcase through the breathers and into the separator.

In the alternate embodiment FIGS. 5 and 6, the piston is located in a closed vertically disposed conduit 70. In FIG. 5 a relief valve assembly 58 is shown that includes a housing 60 with an inlet from the engine 62 and outlet 64. A piston 66 is located in vertical conduit 70 communicating between the inlet and the outlet. The piston is held in the open or raised position by a helical spring 68. The conduit 70 in which the piston is located is closed at the end thereof 72 adjacent the spring. Incorporated into the inlet section is an aperture 74 which is sealed by a relief cap 76.

As shown in FIG. 4 when the vacuum is normal the piston 66 is in an upper position and the cap 76 is in a closed position over aperture 74. As shown in FIG. 5 as the vacuum increases, piston 66 is drawn downwardly constricting the passage way 75 between the inlet and the outlet, reducing the amount of vacuum that is drawn on the crankcase thereby reducing the amount of oil or the tendency for oil to be drawn from the crankcase. As the RPM's of the engine increase and the vacuum increases, the piston is drawn to the fully closed (lowered) position as shown in FIG. 5 totally blocking the passage way 75 between the inlet and the outlet and causing the relief cap 76 to open. As before, the crankcase breathers vent to atmosphere through aperture 74 when passage 75 is partially or fully closed. As the vacuum is reduced, the suction exerted on the piston is reduced and it gradually moves upward under the moving force of the spring 68 and returns to the rest position when the vacuum is reduced to normal.

What is claimed is:

1. A vacuum limiting valve for use in cooperation with an air-oil separator comprising
   a housing having a passageway extending therethrough,
   a conduit extending transversely of the passageway communicating with the passageway, said conduit being open at one end and closed at the opposite end;
   a piston located within the conduit, said piston being movable between a plurality of positions within the conduit for adjusting the effective size of the passageway; and
   means for biasing the piston in a first open position adjacent the open end whereby a decrease in air pressure of a pre-determined magnitude in the passageway pulls the piston toward the closed end of the conduit thereby limiting the size of or completely closing the passageway and opening a pathway to atmosphere through said open end.

2. A valve according to claim I wherein an air-filter is located over the open end of the conduit.

3. A valve according to claim 2 wherein the biasing means is a compression spring.

4. A valve according to claim 3 wherein the compression spring is helical and extends between the closed end of the conduit and the base of the piston.

5. A valve according to claim 4 wherein the piston completely blocks the passageway when the spring is fully compressed.

6. A valve according to claim 5 wherein the inlet to the housing is connected to a breather cap and the outlet from the housing is connected to an induction system of an internal combustion engine.

7. A vacuum relief valve for use in cooperation with an air-oil separator comprising
   a housing having a passageway extending therethrough,
   a conduit extending transversely of the passageway communicating with the passageway, said conduit being closed at both ends;
   a piston located within the conduit, said piston being movable between a plurality of positions from a fully open position to a fully closed position within the conduit for adjusting the effective size of the passageway;
   means for biasing the piston in a fully open position whereby an air pressure drop in the passageway of a pre-determined magnitude pulls the piston toward the fully closed position in the conduit thereby limiting the size of or completely closing the passageway; and
   adjustable vent means communicating with the passageway for providing a pathway to atmosphere.

8. A valve according to claim 7 wherein a normally closed auxiliary port opening to atmosphere is located between an inlet to the housing and the piston.

9. A valve according to claim 8 wherein the biasing means is a compression spring.

10. A valve according to claim 9 wherein the compression spring is helical and extends between one of the fully closed ends of the conduit and the base of the piston.

11. A valve according to claim 10 wherein the piston completely blocks the passageway when the spring is fully extended.

12. A valve according to claim 11 wherein the inlet to the housing is connected to an engine breather cap and the outlet from the housing is connected to an induction system of an internal combustion engine.

13. A valve according to claim 12 wherein a hinged cap is provided on said vent means, said cap being caused to open as the piston closes.

* * * * *